US010684442B2

(12) United States Patent
Weng et al.

(10) Patent No.: US 10,684,442 B2
(45) Date of Patent: Jun. 16, 2020

(54) CAMERA LENS MODULE

(71) Applicant: TDK TAIWAN CORP., Yangmei Taoyuan (TW)

(72) Inventors: Chih-Wei Weng, Yangmei Taoyuan (TW); Chen-Hsien Fan, Yangmei Taoyuan (TW); Cheng-Kai Yu, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 178 days.

(21) Appl. No.: 15/477,594

(22) Filed: Apr. 3, 2017

(65) Prior Publication Data

US 2017/0299839 A1 Oct. 19, 2017

Related U.S. Application Data

(60) Provisional application No. 62/321,916, filed on Apr. 13, 2016.

(30) Foreign Application Priority Data

Feb. 7, 2017 (TW) .............................. 106103908 A

(51) Int. Cl.
*G02B 7/02* (2006.01)
*H04N 5/225* (2006.01)
*G02B 7/08* (2006.01)

(52) U.S. Cl.
CPC ........... *G02B 7/021* (2013.01); *H04N 5/2254* (2013.01); *G02B 7/02* (2013.01); *G02B 7/023* (2013.01); *G02B 7/08* (2013.01)

(58) Field of Classification Search
CPC .... G02B 7/021; G02B 7/002; G02B 7/02–16; G02B 7/18; G02B 6/0086; G02B 6/4201; G02B 6/4261; G02B 6/4263; G02B 6/4251; G02B 6/4219; G02B 6/4256
USPC .......................................................... 359/811
See application file for complete search history.

(56) References Cited

U.S. PATENT DOCUMENTS

| 4,804,331 | A | 2/1989 | Eguchi et al. |
| 4,999,656 | A | 3/1991 | Shimizu et al. |
| 7,570,439 | B2 * | 8/2009 | Bogdan ................ H04N 5/2257 |
| | | | 359/811 |
| 9,703,173 | B2 * | 7/2017 | Brodie ................ H02K 41/0356 |

(Continued)

FOREIGN PATENT DOCUMENTS

| TW | 201301875 A | 1/2013 |
| TW | M521200 U | 5/2016 |
| TW | I536063 B | 6/2016 |

OTHER PUBLICATIONS

An Office Action issued in corresponding TW Application No. 106103908 dated May 23, 2018, 4 pages.

(Continued)

*Primary Examiner* — Kristina M Deherrera
(74) *Attorney, Agent, or Firm* — Muncy, Geissler, Olds & Lowe, P.C.

(57) ABSTRACT

A camera lens module is provided, including a holder, a circuit, and an optical lens. The holder is integrally formed in one piece and forms an accommodation space. The circuit is disposed on the holder. The optical lens is disposed in the accommodation space and in contact with an inner surface of the holder.

17 Claims, 3 Drawing Sheets

(56) References Cited

U.S. PATENT DOCUMENTS

2004/0021951 A1* 2/2004 Maeda .................. G02B 7/021
                                                        359/643
2006/0222300 A1* 10/2006 Frenzel ................. G02B 7/021
                                                         385/88
2008/0037143 A1    2/2008 Yoon

OTHER PUBLICATIONS

An Office Action in corresponding CN Application No. 201710193796.0 dated Jun. 20, 2019 is attached, 4 pages.

* cited by examiner

CAMERA LENS MODULE

CROSS REFERENCE TO RELATED APPLICATIONS

This Application claims priority claims priority of provisional U.S. Patent Application Ser. No. 62/321,916 filed Apr. 13, 2016 and Taiwan Patent Application No. 106103908 filed on Feb. 7, 2017, the entirety of which is incorporated by reference herein.

BACKGROUND OF THE DISCLOSURE

Field of the Invention

The present invention relates to a camera lens module, and more particularly to a miniaturized camera lens module.

Description of the Related Art

With progress of technologies, the cameras have been widely applied to portable electronic devices such as cell phones and tablet computers. To achieve high image quality of the camera, electromagnetic driving mechanisms have been used to rapidly adjust the position of the camera lens module, thus facilitating auto-focus and auto-zoom control of the camera.

As the trend has been miniaturization of the camera, the dimensions of the camera lens module are usually reduced, so that the space for the electrical circuit can be inadequate. It should be noted that during assembly of the camera lens module, the glue is often used to connect a lens barrel with a lens holder surrounding the lens barrel, wherein the optical lenses are received in the lens barrel, and the electrical circuit is disposed on the lens holder. However, the glue may contact the electrical circuit during assembly and cause unintentional short circuit thereof due to the crowded space in the camera lens module. Once the camera lens module is affected by environmental stress (such as humidity variation) or external stress (such as rolling or collision), the glue between the lens barrel and the lens holder may peel off and break the electrical circuit. Therefore, to prevent damage to the electrical circuit while the dimensions of the camera lens module are reduced has become an important issue.

BRIEF SUMMARY OF THE DISCLOSURE

Accordingly, one objective of the present invention is to provide a camera lens module, including a holder, a circuit, and an optical lens. The holder is integrally formed in one piece and forms an accommodation space. The circuit is disposed on the holder. The optical lens is disposed in the accommodation space and in contact with an inner surface of the holder.

According to some embodiments of the disclosure, an optical axis of the camera lens module extends through the center of the optical lens and perpendicular to a reference plane, the projection areas of the circuit and the optical lens onto the plane overlap.

According to some embodiments of the disclosure, a top surface or a side surface of the holder forms a recess receiving the circuit.

According to some embodiments of the disclosure, the circuit is integrally formed on or embedded in the holder by laser direct structuring, insert molding, or molded interconnect device technology.

According to some embodiments of the disclosure, the circuit is disposed on a surface of the holder or embedded in the holder.

According to some embodiments of the disclosure, the camera lens module further comprises a resilient member disposed on the holder and electrically connected to the circuit.

According to some embodiments of the disclosure, the camera lens module further comprises a resilient member with the circuit extended on opposite sides thereof.

According to some embodiments of the disclosure, the holder has a recess receiving a sensor element or an integrated circuit.

According to some embodiments of the disclosure, the recess is formed on a side surface of the holder, and the depth of the recess exceeds the height of the sensor element or the integrated circuit.

According to some embodiments of the disclosure, the recess is formed on a top surface of the holder, and the depth of the recess exceeds the height of the sensor element or the integrated circuit.

BRIEF DESCRIPTION OF THE DRAWINGS

For a more complete understanding of the embodiments, and the advantages thereof, reference is now made to the following descriptions taken in conjunction with the accompanying drawings.

DETAILED DESCRIPTION OF THE ILLUSTRATIVE

Embodiments

While the invention has been described in connection with various aspects, it will be understood that the invention is capable of further modifications. This application is intended to cover any variations, uses or adaptation of the invention following, in general, the principles of the invention, including such departures from the present disclosure as come within the known and customary practice within the art to which the invention pertains.

In the following detailed description of the preferred embodiments, reference is made to the accompanying drawings, and in which specific embodiments of which the invention may be practiced are shown by way of illustration. In this regard, directional terminology, such as "top," "bottom," "front," "back," etc., is used with reference to the orientation of the figures being described. The components of the present invention can be positioned in a number of different orientations. As such, the directional terminology is used for the purposes of illustration and is in no way limiting.

Figure 1A:
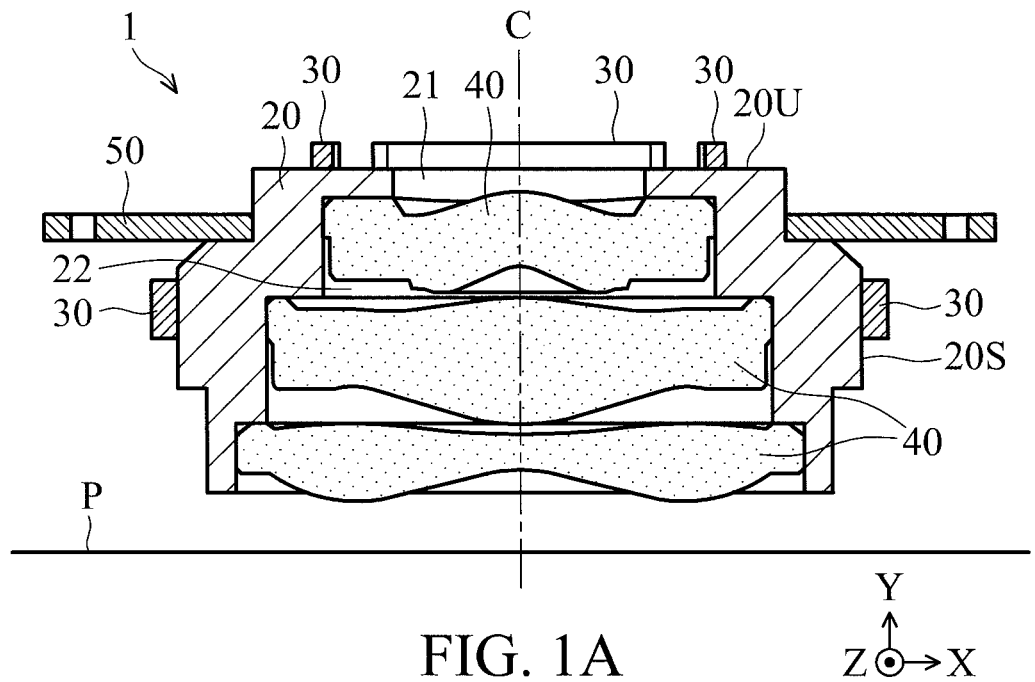
FIG. 1A shows a cross-sectional view of a camera lens module, in accordance with an embodiment of the invention.
Figure 1B:
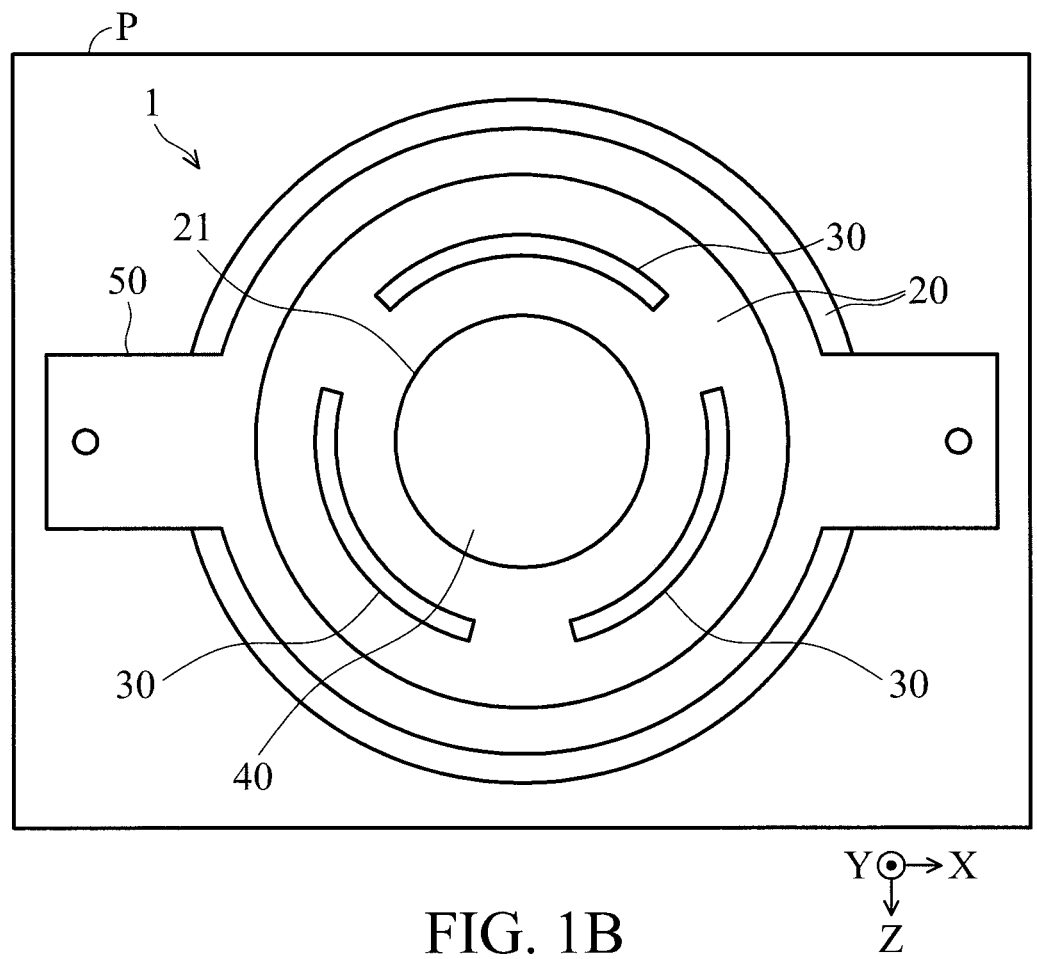
FIG. 1B shows a top view of a camera lens module, in accordance with an embodiment of the invention.

FIGS. 1A and 1B are cross-sectional view and top view of a camera lens module 1 according to an embodiment of the invention. The camera lens module 1 may be disposed in a portable electronic device, such as a cell phone or tablet computer, and an electromagnetic driving unit (not shown) may be provided to adjust the position of the camera lens module 1, so that the light though the camera lens module 1 can be precisely focused onto a photosensor (not shown) to obtain a clear image. In some embodiments, the electromagnetic driving unit may be a Voice Coil Motor (VCM) to achieve autofocusing and/or zooming of the camera lens module 1.

Referring to FIGS. 1A and 1B, the camera lens module 1 primarily comprises a holder 20, a circuit 30, at least an optical lens 40, and at least a resilient member 50. The holder 20 forms a through hole 21 and an accommodation space 22. The circuit 30 and the resilient member 50 are disposed on the holder 20. It should be noted that the resilient member 50 movably connects the holder 20 with a housing (not shown), so that the camera lens module 1 can move along an optical axis C thereof within the housing. The optical lens 40 is disposed in the accommodation space 22 and in contact with an inner surface of the holder 20. It should be noted that, the numbers of the circuit 30, the optical lens 40, and the resilient member 50 can be adjusted and are not limited in the present embodiment. Moreover, the resilient member 50 may also be replaced by other movable mechanisms, such as rollers or balls, to movably connect the holder 20 with the housing.

In this embodiment, the holder 20 has a substantially barrel-shaped structure, and the through hole 21 has a round structure extended through the holder 20 and communicated with the accommodation space 22. However, the material, dimensions and shape of the through hole 21 can be adjusted according to design requirement. For example, the holder 20 may comprise thermosetting plastic material, such as Diallyl Phthalate (DAP), Polyphthalamide (PPA), Liquid Crystal Polymer (LCP), Polyamide (PA), Polycarbonate (PC), Polycarbonate (PC), or Acrylonitrile-Butadiene-Styrene (ABS). The holder 20 can be formed by injection molding or hot pressing. However, the shape and material of the holder 20 are not limited in the present embodiment. In some embodiments, the holder 20 may have a cubic or cuboid structure, and it may be formed by metal material.

As shown in FIGS. 1A and 1B, the circuit 30 in the present embodiment is extended on a top surface 20U and a side surface 20S of the holder 20. The circuit 30 may be integrally formed on the holder 20 by Laser Direct Structuring (LDS), Insert Molding, or Molded Interconnect Device (MID) technology. It should be noted that the circuit 30 is not limited to be formed merely on the top surface 20U or the side surface 20S of the holder 20, it may also be embedded in the holder 20.

Still referring to FIGS. 1A and 1B, the resilient member 50 may be a spring sheet which has a circular structure surrounding an upper portion of the holder 20 for sustaining the holder 20, so that the holder 20 and the optical lenses 40 are suspended within the housing and movable along a vertical direction (Y axis). In some embodiments, two resilient members 50 may be provided and respectively connected to the upper and lower portions of the holder 20, so that the circuit 30 can be electrically connected to a circuit board (not shown) outside the camera lens module 1 through the resilient members 50.

A plurality of optical lenses 40 may be sequentially arranged in the accommodation space 22, as shown in FIG. 1A. The optical lenses 40 may have different dimensions, and they may comprise glass or plastic material. In this embodiment, the optical axis C of the camera lens module 1 extends through the through hole 21 and the center of the optical lenses 40 and is perpendicular to a reference plane P. It should be noted that since a part of the circuit 30 is directly formed on the top surface 20U of the holder 20, the space above the holder 20 can be efficiently utilized by the circuit 30. Specifically, when viewing from the top side of the camera lens module 1 (along the Y axis or the optical axis C), the projection areas of the circuit 30 and at least a part of the optical lens 40 onto the reference plane P overlap, so that the horizontal dimensions of the camera lens module 1 can be greatly reduced.

Figure 2:
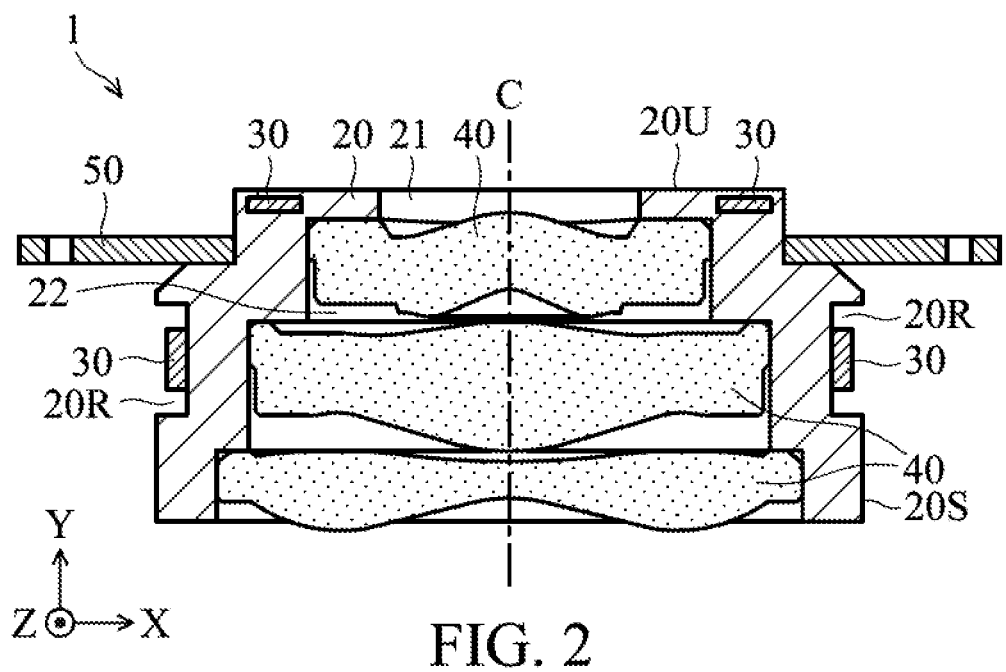
FIG. 2 shows a cross-sectional view of a camera lens module, in accordance with another embodiment of the invention.

FIG. 2 is a cross-sectional view of a camera lens module 1 according to another embodiment of the invention. Referring to FIG. 2, the camera lens module 1 primarily comprises a holder 20, a circuit 30, at least an optical lens 40, and at least a resilient member 50. It should be noted that the present embodiment is different from the embodiment of FIGS. 1A and 1B in that the holder 20 has a recess 20R formed on a side surface 20S thereof for receiving the circuit 30, wherein the height of the circuit 30 is less than the depth of the recess 20R, so as to prevent damage of the circuit 30 due to unintentional impact from external objects. Additionally, a part of the circuit 30 corresponding to the top surface 20U is embedded in the holder 20, wherein the circuit 30 may be integrally formed in the holder 20 by Laser Direct Structuring (LDS), Insert Molding, or Molded Interconnect Device (MID) technologies.

Figure 3:
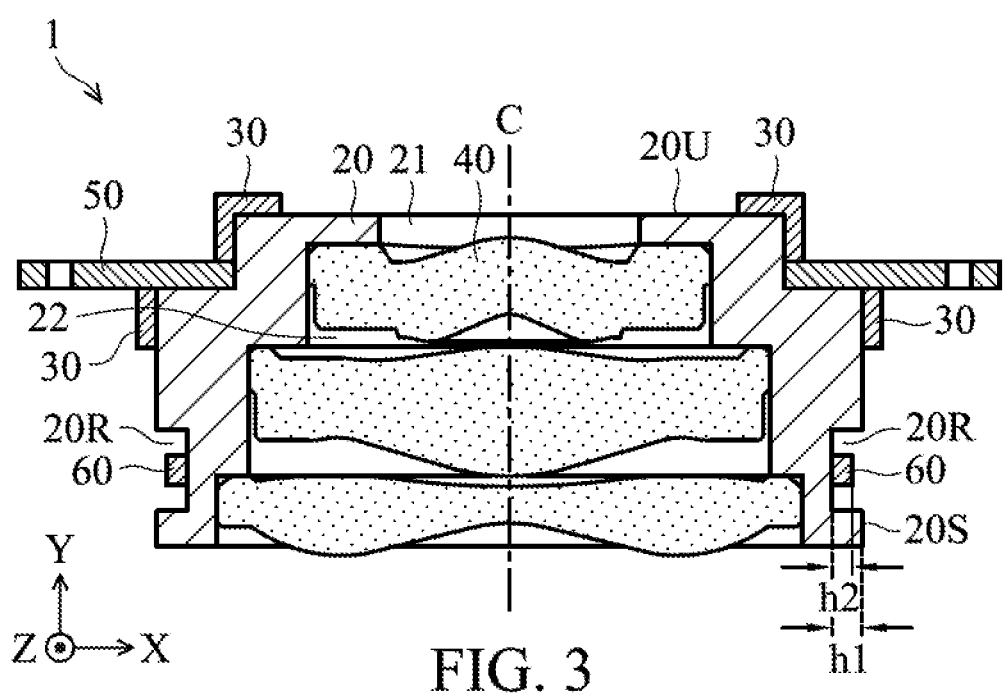
FIG. 3 shows a cross-sectional view of a camera lens module, in accordance with another embodiment of the invention.

FIG. 3 is a cross-sectional view of a camera lens module 1 according to another embodiment of the invention. Referring to FIG. 3, the camera lens module 1 primarily comprises a holder 20, a circuit 30, at least an optical lens 40, and at least a resilient member 50. It should be noted that the present embodiment is different from the embodiment of FIGS. 1A and 1B in that the holder 20 has a recess 20R formed on a side surface 20S thereof for receiving an electronic component 60, wherein the circuit 30 is electrically connected to the resilient member 50 and extended on opposite sides thereof. In some embodiments, the component 60 may comprise a sensor element or an integrated circuit, wherein an electronic signal from the sensor element or the integrated circuit can be transferred through the circuit 30 and the resilient member 50 to an external control system (not shown) outside the camera lens module 1. The control system can control a driving current supplied to the electromagnetic driving unit according to the electronic signal, so as to rapidly move the camera lens module 1 to an appropriate position relative to the housing and achieve auto-focusing of the camera lens module 1.

Figure 4:
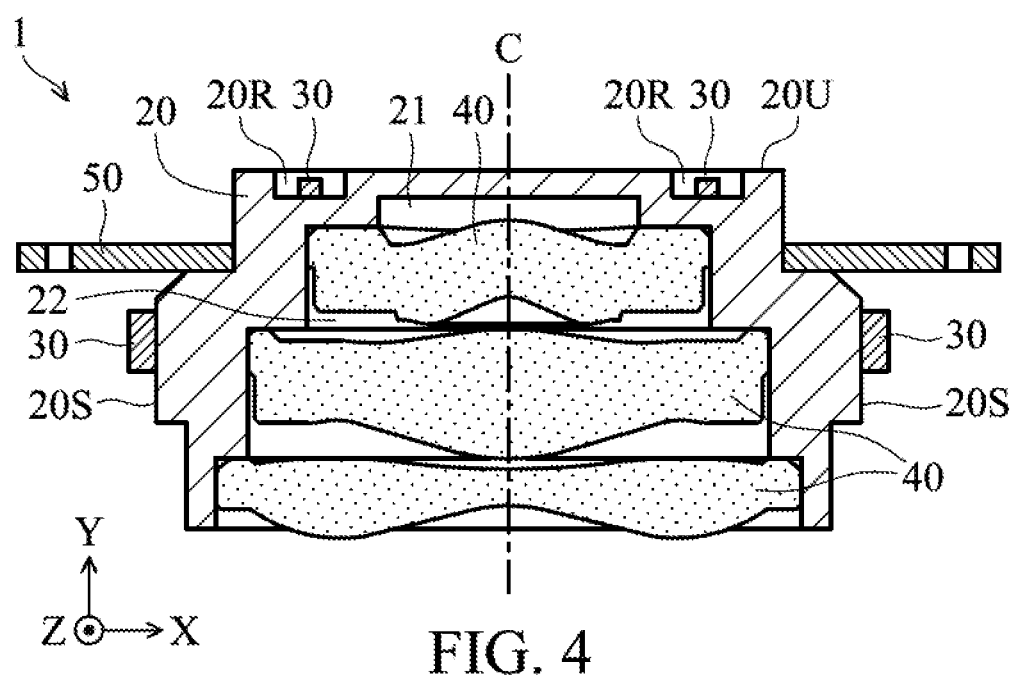
FIG. 4 shows a cross-sectional view of a camera lens module, in accordance with another embodiment of the invention.

FIG. 4 is a cross-sectional view of a camera lens module 1 according to another embodiment of the invention. Referring to FIG. 4, the camera lens module 1 primarily comprises a holder 20, a circuit 30, at least an optical lens 40, and at least a resilient member 50. It should be noted that the present embodiment is different from the embodiment of FIGS. 1A and 1B in that the holder 20 has a recess 20R formed on a top surface 20U thereof for receiving a circuit 30, wherein the height of the circuit 30 is less than the depth of the recess 20R, so as to prevent damage of the circuit 30 due to unintentional impact from other objects.

The invention provides a camera lens module including a holder, a circuit, and an optical lens. The holder is integrally formed in one piece and forms an accommodation space. The circuit is disposed on the holder. The optical lens is disposed in the accommodation space and in contact with an inner surface of the holder. Specifically, an optical axis of the camera lens module extends through the center of the optical lens and perpendicular to a reference plane (such as the reference plane P as shown in FIG. 1A and FIG. 1B), and the projection areas of the circuit and the optical lens onto the plane overlap. The present invention can save production cost and space for the arrangement of the circuits and electronic components as the lens barrel and the lens holder are integrally formed in one piece. Moreover, the damage of the circuit and the electronic components due to unintentional impact from other objects can also be prevented, so as to achieve miniaturization of reliability of the product.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A camera lens module, comprising:
    a holder, integrally formed in one piece and having an accommodation space;
    a circuit, disposed on the holder and having an electrical connection portion, wherein the electrical connection portion is in direct contact with a surface of the holder;
    an optical lens, disposed in the accommodation space and in contact with an inner surface of the holder; and
    a resilient member, disposed on the holder and electrically connected to the circuit,
    wherein an optical axis of the camera lens module extends through a center of the optical lens and perpendicular to a reference plane, and projection areas of the circuit and the optical lens onto the reference plane overlap.

2. The camera lens module as claimed in claim 1, wherein a top surface or a side surface of the holder forms a recess receiving the circuit.

3. The camera lens module as claimed in claim 1, wherein the circuit is integrally formed on or embedded in the holder by laser direct structuring, insert molding, or molded interconnect device technology.

4. The camera lens module as claimed in claim 1, wherein the circuit extends on opposite sides of the resilient member.

5. The camera lens module as claimed in claim 1, wherein the holder has a recess receiving a sensor element or an integrated circuit.

6. The camera lens module as claimed in claim 5, wherein the recess is formed on a side surface of the holder, and the depth of the recess exceeds the height of the sensor element or the integrated circuit.

7. The camera lens module as claimed in claim 5, wherein the recess is formed on a top surface of the holder, and the depth of the recess exceeds the height of the sensor element or the integrated circuit.

8. A camera lens module, comprising:
    a holder, having an accommodation space;
    a circuit, disposed on the holder and having an electrical connection portion, wherein the electrical connection portion is in direct contact with a surface of the holder;
    an optical lens, disposed in the accommodation space and in contact with an inner surface of the holder; and
    a resilient member, disposed on the holder and electrically connected to the circuit,
    wherein an optical axis of the camera lens module extends through a center of the optical lens and perpendicular to a reference plane, and projection areas of the circuit and the optical lens onto the reference plane overlap.

9. The camera lens module as claimed in claim 8, wherein the holder comprises thermosetting plastic material.

10. The camera lens module as claimed in claim 8, wherein a top surface or a side surface of the holder forms a recess receiving the circuit.

11. The camera lens module as claimed in claim 8, wherein the circuit is integrally formed on or embedded in the holder by laser direct structuring, insert molding, or molded interconnect device technology.

12. The camera lens module as claimed in claim 8, wherein the circuit extends on opposite sides of the resilient member.

13. The camera lens module as claimed in claim 8, wherein the holder has a recess receiving a sensor element or an integrated circuit.

14. The camera lens module as claimed in claim 13, wherein the recess is formed on a side surface of the holder, and the depth of the recess exceeds the height of the sensor element or the integrated circuit.

15. The camera lens module as claimed in claim 13, wherein the recess is formed on a top surface of the holder, and the depth of the recess exceeds the height of the sensor element or the integrated circuit.

16. A camera lens module, comprising:
    a holder, integrally formed in one piece and having an accommodation space;
    a circuit, disposed on the holder and having an electrical connection portion, wherein the electrical connection portion is in direct contact with a surface of the holder;
    an optical lens with an optical axis, disposed in the accommodation space and in contact with an inner surface of the holder; and
    a resilient member, wherein when viewed along a direction that is perpendicular to the optical axis, the resilient member partially overlaps the optical lens,
    wherein the circuit extends on opposite sides of the resilient member in a direction that is parallel to the optical axis.

17. The camera lens module as claimed in claim 16, wherein the circuit and the optical lens partially overlap when viewed along a direction that is perpendicular to the optical axis.

* * * * *